United States Patent [19]

Masunaga

[11] Patent Number: 5,056,891
[45] Date of Patent: Oct. 15, 1991

[54] METHOD OF PREPARING INFORMATION READING APPARATUS AND OBJECTIVE LENS SUSPENSION BODY

[75] Inventor: Yoshifumi Masunaga, Tokorozawa, Japan

[73] Assignee: Pioneer Electronic Corporation, Tokyo, Japan

[21] Appl. No.: 495,967

[22] Filed: Mar. 20, 1990

[30] Foreign Application Priority Data

May 22, 1989 [JP] Japan .................................. 1-128544

[51] Int. Cl.[5] .......................... B02B 7/02; G11B 7/00; G11B 21/10
[52] U.S. Cl. ................................. 359/813; 369/44.15; 369/44.16; 359/823
[58] Field of Search ............... 369/44.14, 44.15, 44.16; 350/255, 257, 247

[56] References Cited

U.S. PATENT DOCUMENTS

| | | | |
|---|---|---|---|
| 4,538,882 | 11/1985 | Tanaka et al. | 369/44.16 |
| 4,616,355 | 10/1986 | Kashara | 369/44.16 |
| 4,817,076 | 3/1989 | Van Sluys et al. | 350/255 |
| 4,878,214 | 10/1989 | Hinotani | 369/44.15 |

Primary Examiner—Ian J. Lobo
Attorney, Agent, or Firm—Sughrue, Mion, Zinn, Macpeak & Seas

[57] ABSTRACT

An information reading apparatus generally comprises a body for accommodating optical elements such as a semiconductor laser, a photodiode and a prism, an objective lens disposed on a base of the body for reading information recorded in a recording medium, and an actuator means for positioning the objective lens with respect to a compact disk and actuating the objective lens in a direction along an optical axis thereof. In assembling the information reading apparatus, a base of the actuator means is mounted on the body, and an objective lens suspension body including an objective lens holder and a suspension base member connected thereto through a pair of bridge members is prepared by an injection molding. The bridge members are removed after the objective lens suspension body is mounted on the base of the actuator means.

10 Claims, 7 Drawing Sheets

METHOD OF PREPARING INFORMATION READING APPARATUS AND OBJECTIVE LENS SUSPENSION BODY

BACKGROUND OF THE INVENTION

This invention relates to a method of preparing an information reading apparatus for reading information recorded on a disk in a disk reproducing device and an objective lens suspension body utilized for preparing the same and, more particularly, to a method and an objective lens suspension body for assembling an actuator means for positioning the objective lens disposed in the disk reproduction device.

Generally, in a photodisk device such as a compact disk, the photodisk is positioned in the reproduction device and the information on the disk is read by a information reading device, i.e., a pickup means, disposed above the photodisk device, while rotating the photodisk.

A general pickup means comprises a body, which is movable in a radial direction of a photodisk by means of a carriage servo-mechanism. A base is secured on the upper surface of the body, and a holder for supporting an objective lens is suspended by the base through a plurality of, such as four, tubes formed of wires or rubber dampers. The holder is movable in vertical and bilateral directions by means of electromagnetic mechanisms disposed on both the sides of the holder. The tubes, the holder and the electromagnetic mechanisms constitute an actuator means for positioning the objective lens with respect to a compact disk.

The assembling of the actuator means of the structure described above is carried out by means of a specific jig and one jig is required to assemble one actuator means. In the conventional actuator assembling method by using such specific jig, it is difficult to carry out the assembling of the actuator means with high accuracy and to perform mass-production thereof. Moreover, it is also difficult to position the objective lens with high precision because of the performance of the jig itself to be used.

SUMMARY OF THE INVENTION

An object of this invention is to substantially eliminate the defects and drawbacks encountered to the prior art technique described above and to provide a method of and an objective lens suspension body for preparing an information reading apparatus capable of easily assembling with high accuracy and reduced cost.

Another object of this invention is to provide a method of preparing an information reading apparatus including an actuator assembly capable of easily being assembled and operating accurately.

These and other objects can be achieved according to this invention by providing a method of preparing an information reading apparatus comprising a body for accommodating optical elements such as a semiconductor laser, a photodiode and a prism, an objective lens disposed on a base of the body for reading information recorded in a recording medium, and an actuator means for positioning said objective lens with respect to a compact disk and actuating said objective lens in a direction along an optical axis thereof, said method comprising: the steps of mounting a base of said actuator means onto said body; preparing an objective lens suspension body for suspending an objective lens holder from a suspension base member through a connection means; securing necessary elements such as coils, suspension wires, etc. to said objective lens suspension body; mounting said objective lens suspension body on said base of the actuator means; and removing said connection means from the objective lens holder and the supporting base member so as to suspend said objective lens holder from said suspension base member.

Further, according to this invention, there is provided an objective lens suspension body utilized for preparing an information reading apparatus which comprises: a lens holder for supporting an objective lens; a suspension base member for suspending said lens holder which is separated therefrom; and a connection means for connecting said suspension base member to said lens holder, said connection means being easily removed from said suspension base member and lens holder.

In a preferred embodiment, the objective lens suspension body is integrally formed by the injection molding method. The connection means comprises a pair of bridge members having a thin thickness so as to be easily broken when they are twisted. The connection means in form of a bridge is forcibly removed after the predetermined elements or members are attached to the objective lens suspension body which is mounted on the body of the information reading apparatus.

DESCRIPTION OF THE PREFERRED EMBODIMENTS

Figure 14:
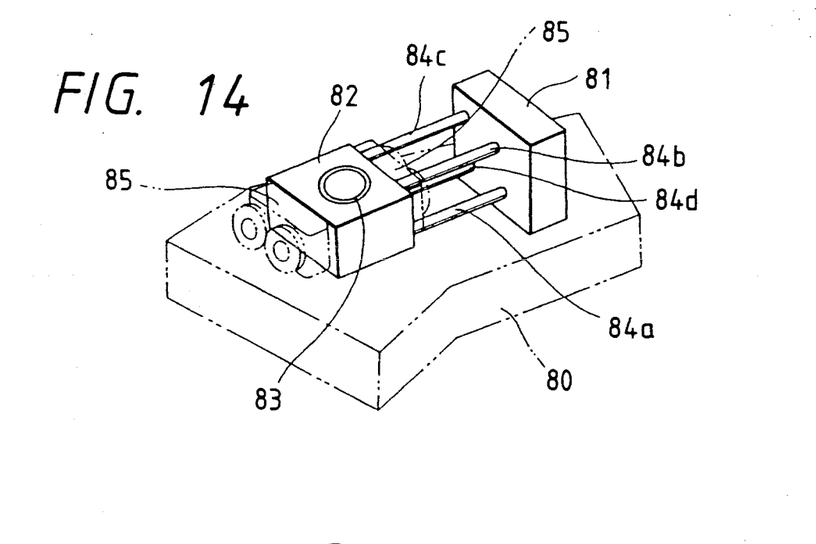
FIG. 14 is a perspective view of a conventional information reading apparatus.
Figure 15:
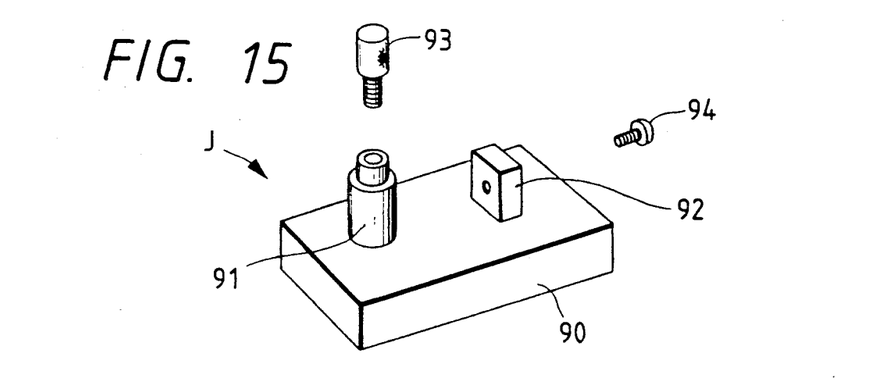
FIG. 15 is a perspective view of a jig member utilized for assembling an actuator means of the conventional information reading apparatus.
Figure 16:
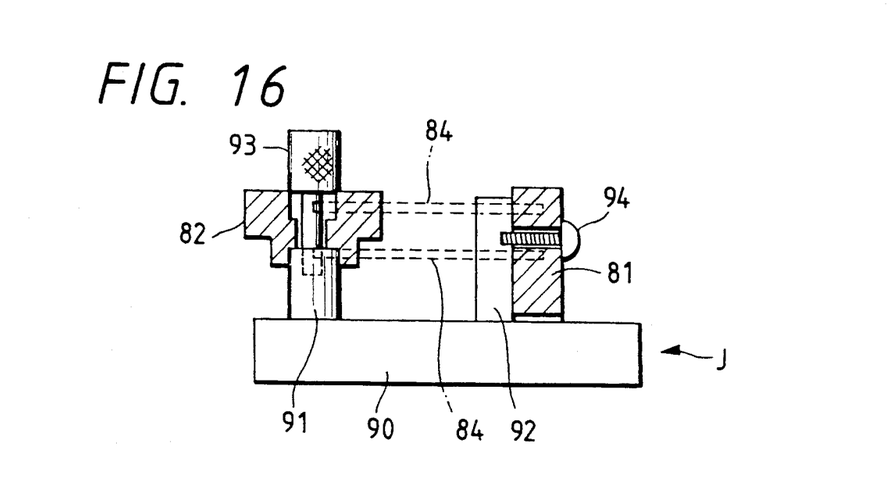
FIG. 16 is a view for the explanation of the assembling. of the conventional actuator means.

For a better understanding of this invention, a prior art technique and the defects or drawbacks encountered thereto will be first described hereunder with reference to FIGS. 14 to 16.

FIG. 14 shows ah information reading apparatus in the form of a general pickup means, disposed in a photodisk reproduction device, which comprises a body 80, which is movable in a radial direction of a photodisk by means of a carriage servo-mechanism. A base 81 is secured on the upper surface of the body 80 and a holder 82 for supporting an objective lens 83 is suspended by the base 81 through a plurality of, such as four, tubes 84a to 84d formed of wires or rubber dampers. The holder 82 is movable in vertical and bilateral directions by means of electromagnetic mechanisms 85 and 85 disposed on both the sides of the holder 82. The tubes 84a to 84d, the holder 82 and the electromagnetic mechanisms 85 constitute an actuator means for positioning the objective lens 83 with respect to a compact disk.

The assembling of the actuator means of the structure described above is carried out by utilizing a specific jig member J such as shown in FIGS. 15 and 16 in a conventional assembling method.

Referring to FIG. 15, the jig J comprises a base 90 having an upper surface on which a lens holder securing pole 91 for supporting the lens holder 82 is mounted. A projecting piece 92 is also disposed on the upper surface of the base 90 apart form the lens holder securing pole 91 by a predetermined distance for securing the supporting base 81 of the pickup means. When it is required to assemble the actuator means, the lens holder 82 and the supporting base 81 are secured to the pole 91 and the projecting piece 92 by means of fastening screws 93 and 94, respectively. The suspension members, i.e., tubes 84a to 84d are thereafter bonded to the lens holder 82 and the supporting base 81 by using a bonding agent. The bonded condition, such as shown in FIG. 16, is kept about 30 min. or one hour by the time when the bonding agent is hardened and, after the hardening of the bonding agent, the jig J is disassembled and removed.

According to the conventional assembling method, as described above, it is necessary to prepare one specific jig for assembling one actuator means and a considerably long time of about 30 to 60 min. is required for hardening the bonding agent utilized for bonding the suspension members to the supporting base. Accordingly, the attachment of the actuator means to the body of the pickup means is delayed by the time required for the hardening of the bonding agent and, otherwise, a plurality of jigs of same types have to be prepared for effectively and continuously assembling the actuator means to the body of the pickup means. It is therefore not proper to carry out the mass-production of the devices. In addition, it is required to prepare the jig provided with a high positioning accuracy because the objective lens is to be accurately positioned with respect to the suspension member thereof, which results in the increasing of the cost of the actuator means assembled by using such a specific jig. Moreover, much care should be taken for the maintenance of the jig because of the adhesion of the bonding agent thereto for the bonding of the suspension member. The accuracy of the jig affects on the inclination of the objective lens and, hence, the accurate positioning of the objective lens.

An information reading apparatus conceived by this invention for substantially eliminating the defects or drawbacks encountered to the prior art described above will be described hereunder in conjunction with FIGS. 1 to 4.

Figure 1:
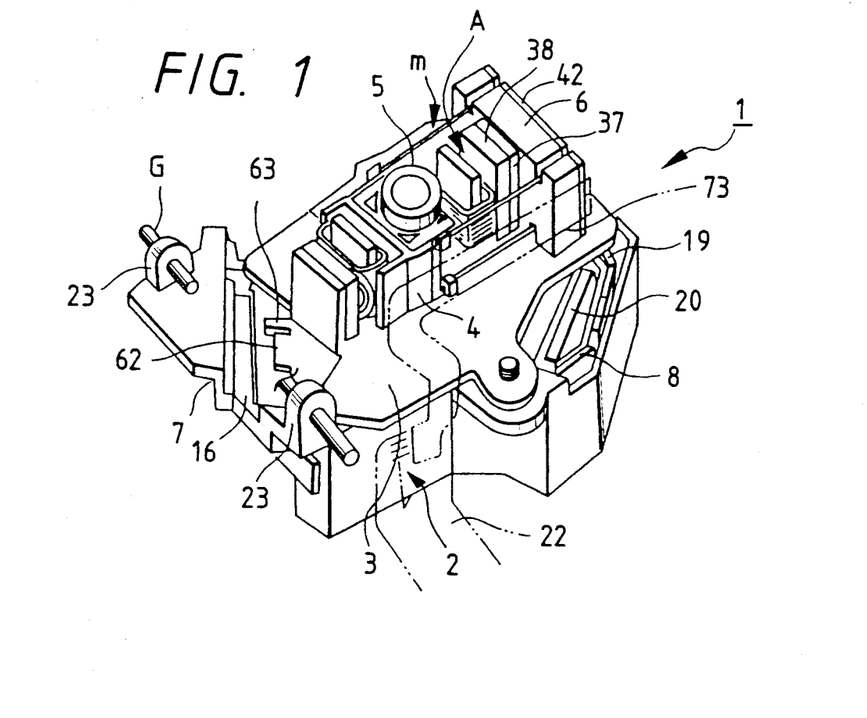
FIG. 1 is a perspective view of an information reading apparatus according to this invention.

Referring to FIG. 1, an information reading apparatus 1 comprises a body 2 in the form of a plastic frame and a yoke base 3 is disposed on the upper surface, as viewed in FIG. 1, of the body 2. An actuator assembly A for positioning an objective lens 5 with respect to a compact disk is mounted on the yoke base 3. The actuator assembly A is provided with a suspension base member 6 standing vertically at one end of the yoke base 3, A lens holder 4 for supporting the objective lens 5 is suspended from the supporting base plate 6 through a suspension mechanism m. A semiconductor laser accommodating portion 7 is provided at one end, lefthand end as viewed, of the body 2 for accommodating a semiconductor laser and a PD accommodating portion 8 is also provided at the other end, righthand end as viewed, of the body 2 for accommodating a light receiving diode, i.e., photodiode (PD).

Figure 4:
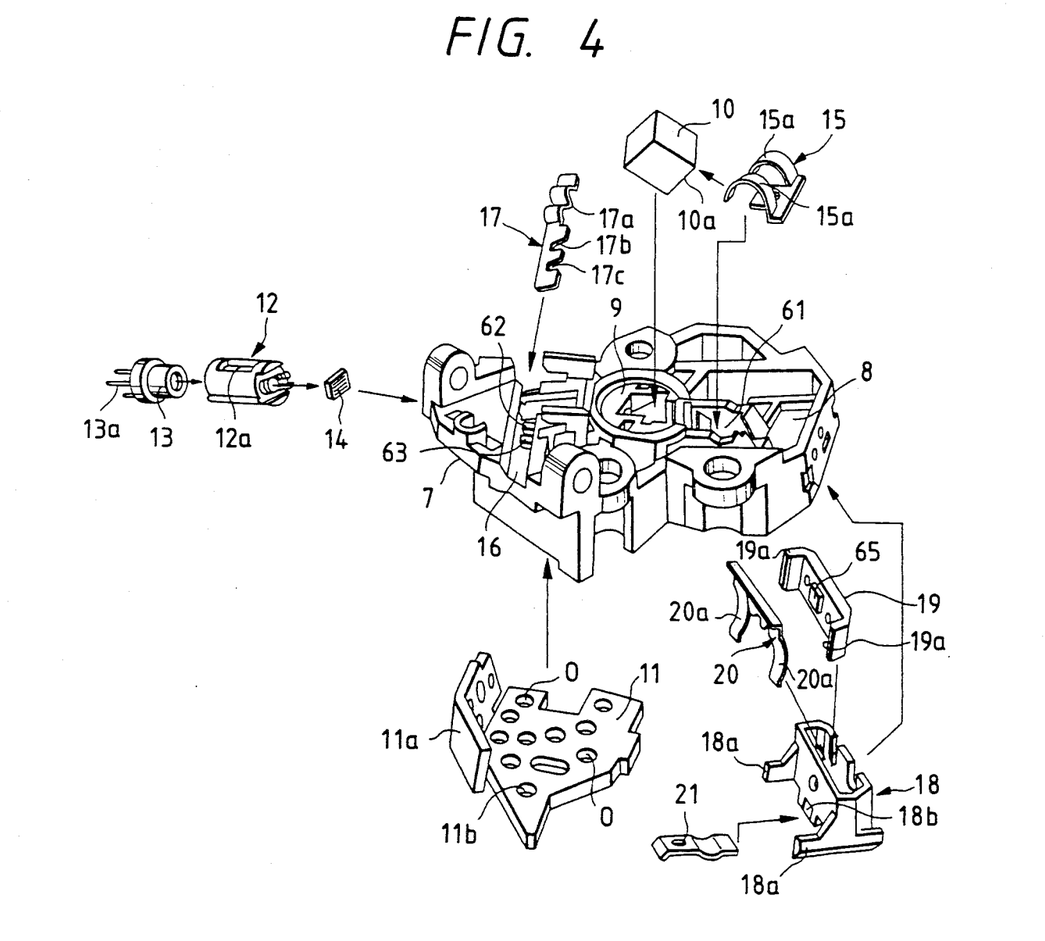
FIG. 4 is an exploded perspective view showing the elements constituting the information reading apparatus shown in FIG. 1.

A prism accommodating portion 9, as shown in detail in FIG. 4, is provided at substantially the central portion of the body 2 and a prism 10 is obliquely positioned in the prism accommodating portion 9 in a manner such that the prism 10 is held in the body 2 under the pressed condition by means of a prism holder 15 comprising an elastic spring member. The prism holder 15 is mounted in a recess 6 formed adjacent to the prism accommodating portion 9 and is provided with arms 15a and 15a abutting against the oblique lower surface 10a of the prism 10 to thereby press the same. In the semiconductor laser accommodating portion 7 is provided a semiconductor laser holding plate 11 having a rising portion 11a, which abuts against the side surface of the body 2 and from which a terminal 13a of the semiconductor laser 13 projects. The semiconductor laser 13 is accommodated in one end portion of a cylindrical grating holder 12 which has the other end into which a grating member 14 is accommodated.

Figure 2:
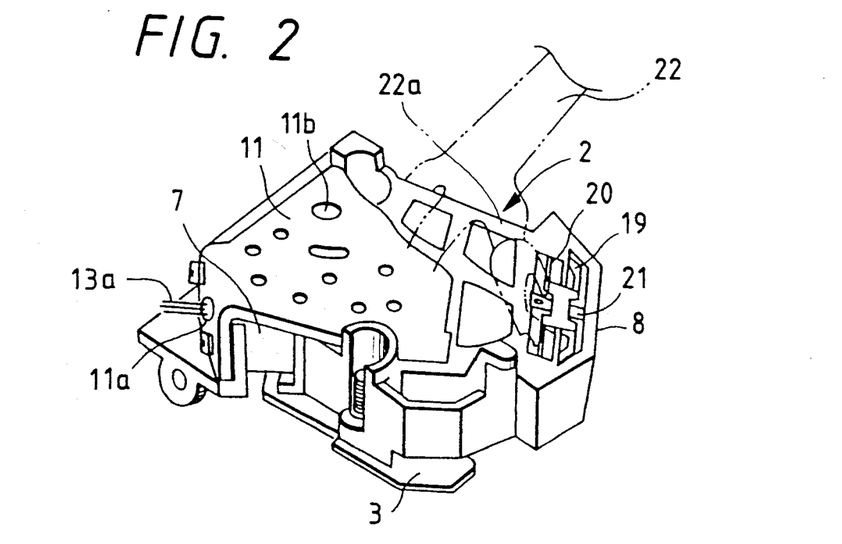
FIG. 2 is a perspective view of the apparatus shown in FIG. 1, but viewed from the rear side thereof.
Figure 3:
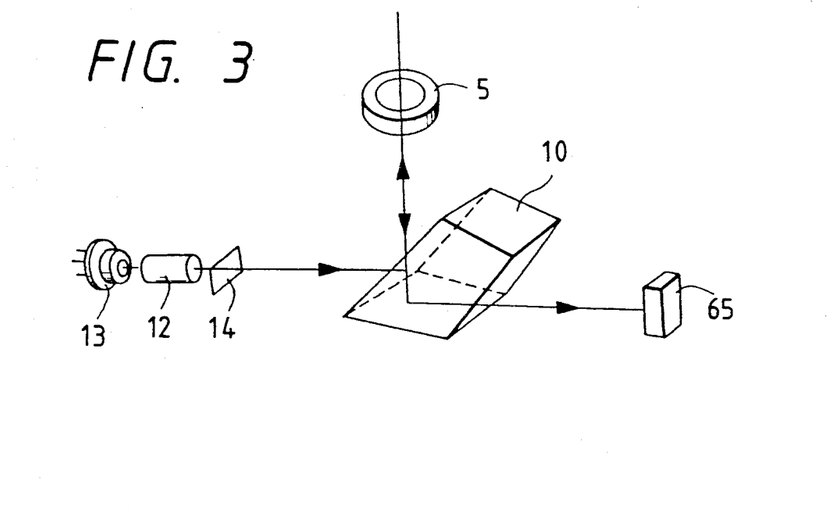
FIG. 3 shows an arrangement of elements constituting the information reading apparatus shown in FIG. 1.

As shown in FIG. 4, the semiconductor laser accommodating portion 7 of the body 2 has an upper portion in which is formed a slide groove 16 having slidably a grating holder holding plate 17 therein. The grating holder holding plate 17 is provided with an engaging portion 17a formed in a wave shape to be engageable with a groove 12a formed in the outer peripheral surface of the grating holder 12 and also provided with two notches 17b and 17c adjacent to the engaging portion 17a. The grating holder holding plate 17 is guided by guiding projections 62 and 63 extending from the side surface of the groove 16 so that the holding plate 17 does not extend outwardly from the groove 16. A tool such as a female driver is inserted into the notch 17b through an opening 11b formed in the semiconductor laser holding plate 11 as shown in FIG. 2 on the rear side of the body 2. When the tool is rotated in the bilateral directions with being engaged with the notch 17b, the grating holder holding plate 17 is slightly slid in the bilateral direction. The grating holder 12 is accordingly slightly rotated and the grating member 14 held by the grating holder 12 is in turn rotated to thereby perform the grating adjustment. Another tool of the type described above is engaged with the notch 17c by inserting the tool form the upper side of the body 2, whereby the grating holder holding plate 17 is bilaterally slightly slid to perform the adjustment of the grating means 14.

In the PD accommodating portion 8 is provided a PD base 18 having a frame structure in which are accommodated a PD plate 19 and a PD holder 20 having an elasticity and provided with two legs 20a and 20a. The PD holder 20 abuts against the both ends 19a and 19a of the PD plate 19 so as to hold the same in the PD base 18 to be positionally adjustable. A photodiode (PD) 65 is held to the inside surface of substantially the central portion of the PD plate 19.

The PD base 18 is provided with both side surfaces, and guide rails 18a and 118a are disposed at the lower portions of the side surfaces of the PD base 18. The guide rails 18a and 18a are to be engaged with guide grooves, not shown, formed in the side surfaces of the PD accommodating portion 8. An opening 18b is formed in the lower surface of the PD base 18, and a PD base holder 21 formed by an elastic plate penetrates the opening 18b. Both the ends of the PD base holder 21 cross the central portion of the holder accommodating portion 8, as shown in FIG. 2, and are secured to the opposing side end portions. Namely, the PD plate 19 is elastically held by the PD holder 20, so that the PD plate 19 can slightly change the position in the PD base 18 and whole PD base 18 can also be moved toward and away form the prism accommodating portion 9 in the recess formed in the PD accommodating portion 8 of the base 2.

Figure 5:
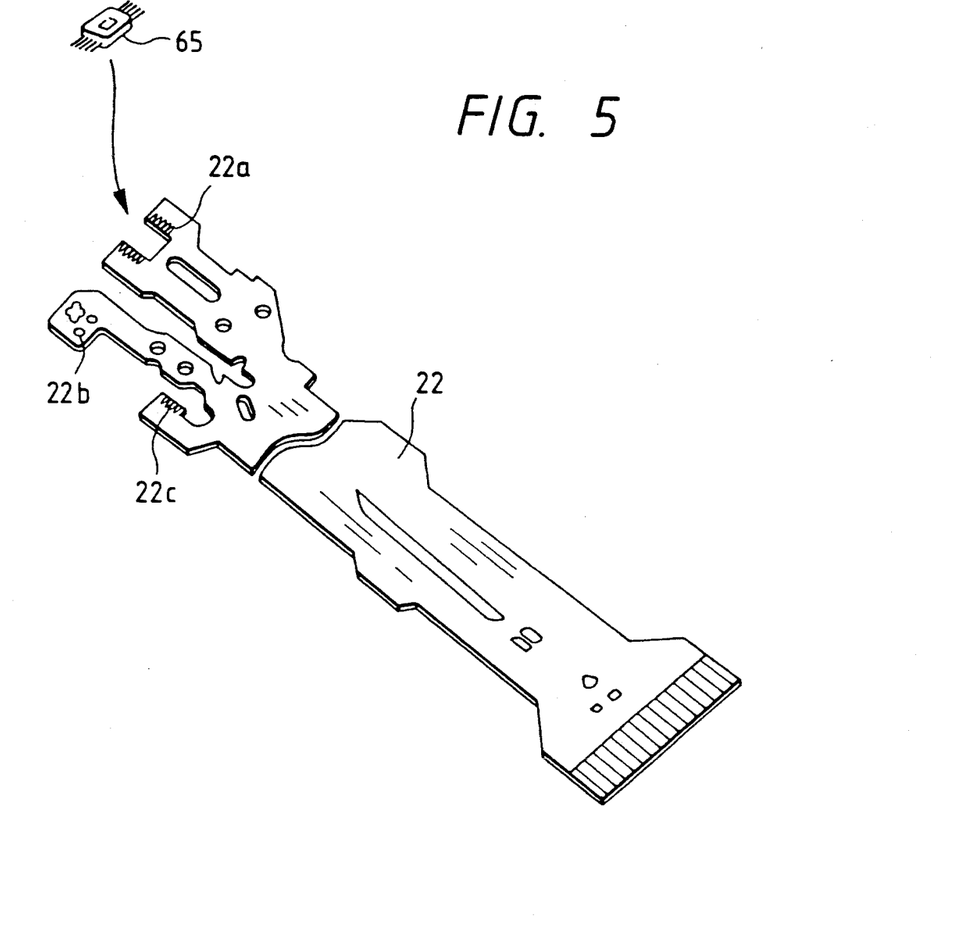
FIG. 5 is a perspective view of a flexible substrate.

The actuator assembly A, the PD 65 and the semiconductor laser 13 are mutually connected in a circuit, not shown, by means of a flexible substrate 22 made of polyphenylene sulfide such as shown in FIG. 5. The flexible substrate 22 is provided with branches 22a, 22b and 22c in a manner that the branch 22a is connected to the PD 65, the branch 22b is connected to the semiconductor laser 13 and the branch 22c is connected to the actuator assembly A through a connection flexible substrate 73 shown in FIG. 6.

Two ear pieces 23 and 23 are formed on both sides of the lefthand ends, as viewed in FIG. 1, of the body 2 and the ear pieces 23 and 23 are provided with openings through each of which a guide rod G is slidably inserted so that the body 2 can be slid in the radial direction of the photodisc along the guide rod G.

The branch portion 22a of the flexible substrate 22 is once bent on the upper surface, FIG. 2, of the body 2 and then extends towards the lower surface, FIG. 2, of the body 2 through the inside of the PD accommodating portion 8. The branch portion 22a is thereafter bent as shown in FIG. 1 and inserted to the position of the PD 65. As described, by extending the branch portion 22a to the position of the PD 65 while leaving a margin in the length thereof, the force applied to the flexible substrate 22 is not transferred to the PD 65, whereby the attaching position of the PD 65 is not displaced or offset and, accordingly, the long stable reliability can be achieved for the operation of the information reading apparatus.

The structure of the actuator assembly A will be described in detail hereunder with reference to FIGS. 6 to 12.

Figure 8:
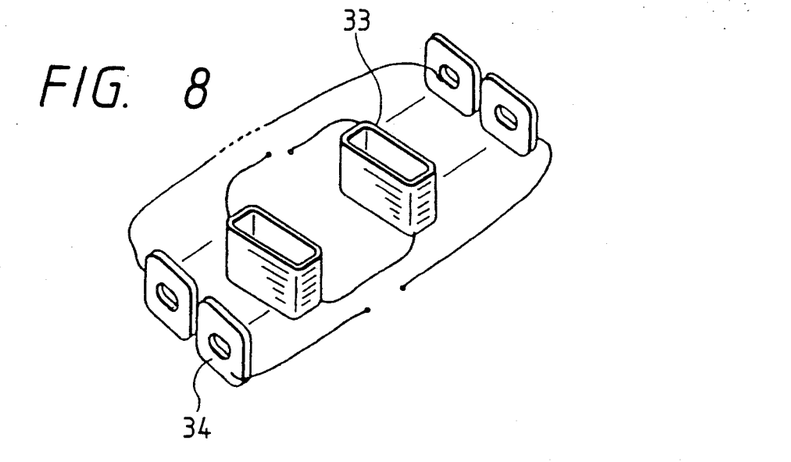
FIG. 8 is an exploded perspective view of coil means shown in FIG. 7.
Figure 10:
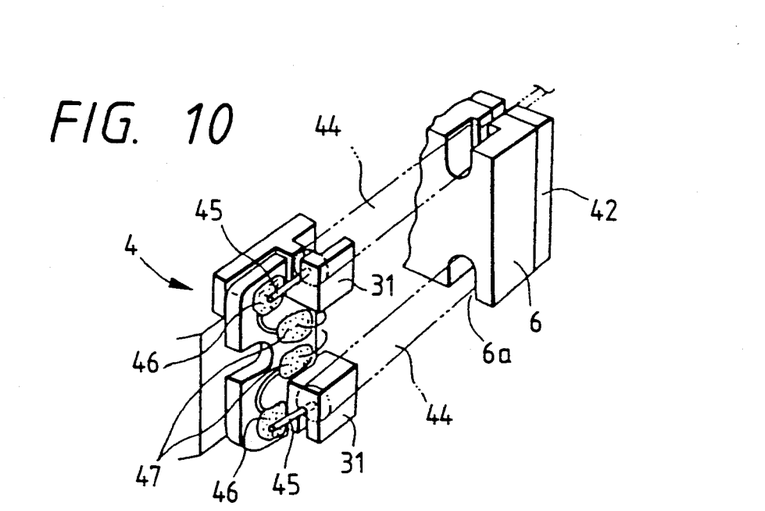
FIG. 10 is a perspective view of a suspension mechanism of the information reading apparatus.

The lens holder 4 is of substantially a rectangular outer appearance and is provided, at a central portion thereof, with a recess 30 into which the lower portion of the objective lens 5 is accommodated. A plurality of damper tube supporting portions 31, 31 --- 31 are formed at upper and lower portions of bilateral sides of the lens holder 4 and one end of a damper tube 44 of the type shown in FIG. 10 is accommodated into each of the damper tube supporting portions 31. Focus coils 33 and 33 as shown in FIG. 8 are accommodated in coil accommodating portions formed at front and rear portions of the lens holder 4 and two tracking coils 34 and 34 are attached to the outer surfaces of the focus coils 33 and 33, respectively.

Figure 9:
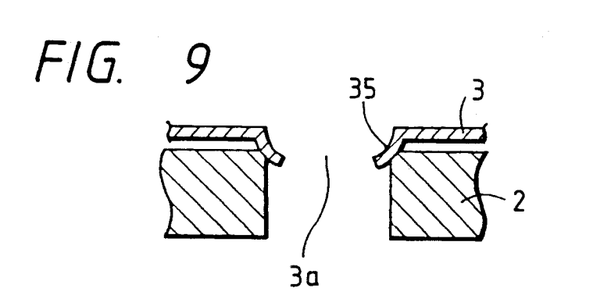
FIG. 9 is a view showing a structure of a skew showing in FIG. 7.

The yoke base 3 is provided with a circular opening 3a at the central portion of the yoke base 3, and a bent engaging portion 35 is formed around the circular opening 3a as best shown in FIG. 9. The bent engaging portion 35 is attached to the body 2 so as to be angularly adjustable. The yoke base 3 is provided with the outside portions in which are formed screw holes 39, 40 and 41 with which skew adjusting screws 70 and 70 and screw 71 are engaged through the body 2. The screw 71 is mounted coaxially with a spring 72 for urging the yoke base against the body 2. The rotation of the skew adjusting screw 70 makes it possible to adjust the skew of the bent engaging portion 35 with respect to the body 2. Yokes 36 and 36 are provided in an oppositely standing manner at portions near the opening 3a of the yoke base 3 and the focus coils 33 and 33 are respectively mounted to the yokes 36 and 36 with spaces. Magnet supporting plates 37 and 37 are disposed in a standing manner at portions outside the yokes 36 and 36 with spaces, respectively, and two magnets 38 are secured to two magnet supporting plates 37 and 37, respectively. The suspension base member 6 is secured to the rear surface of one of the magnet supporting plates 37, and to the suspension base member 6 is secured a plate 42 to which one end of a flexible substrate 73 is connected. The other end of the flexible substrate 73 is connected to the branch portion 22a of the flexible substrate 22 shown in FIG. 5.

Figure 11:
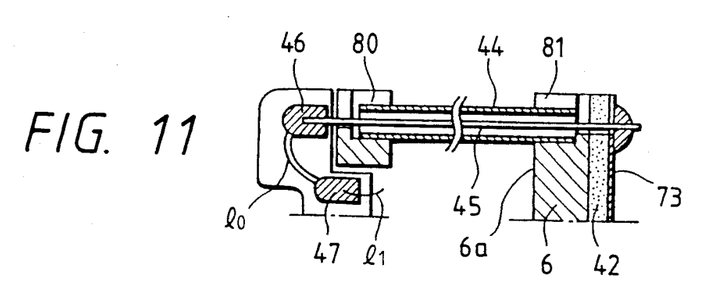
FIG. 11 is an elevational section of the suspension mechanism shown in FIG. 10.
Figure 12:
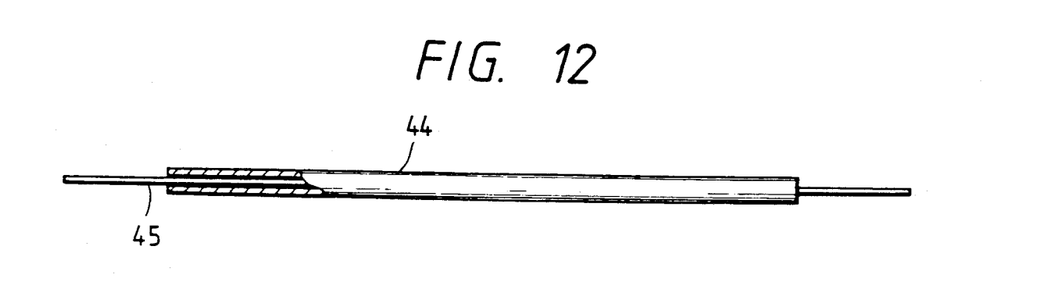
FIG. 12 shows one damper tube having a portion partially broken.

The damper tube supporting member 31 located on the side surface of the lens holder 4 is provided with a U-shaped groove 80 in which one end of the damper tube 44 is engaged. The supporting base plate 6 is also provided with a U-shaped groove 81 at each side thereof, and the other end of the damper tube 44 covers, as shown in FIG. 12, the outer periphery of the wire 45 made of beryllium copper which is rich in the elasticity and durability. The wire 45 extends from the flexible substrate 73 towards a round piece 46 disposed on the side surface of the lens holder 4, and the round piece 46 is further connected integrally or through a lead $l_0$ to another round piece 47 which in turn is connected through a lead $l_1$ to either one of the tracking coil 34 or the focus coil 33 (FIGS. 10 and 11). An electric current is conducted to the other one of the tracking coil 34 or the focus coil 33 from a round piece, not shown, formed on an opposite side of the lens holder 4 through the wire 45. An electric current is conducted from a power source, not shown, to the coils 33 and 34 through the flexible substrate 73 and four wires 45, whereby the electromagnetic mechanisms are controlled by a servo-mechanism and the positioning of the objective lens 5 can be adjusted with respect to the photodisk.

The assembling of the actuator assembly A will be described hereunder.

Figure 6:
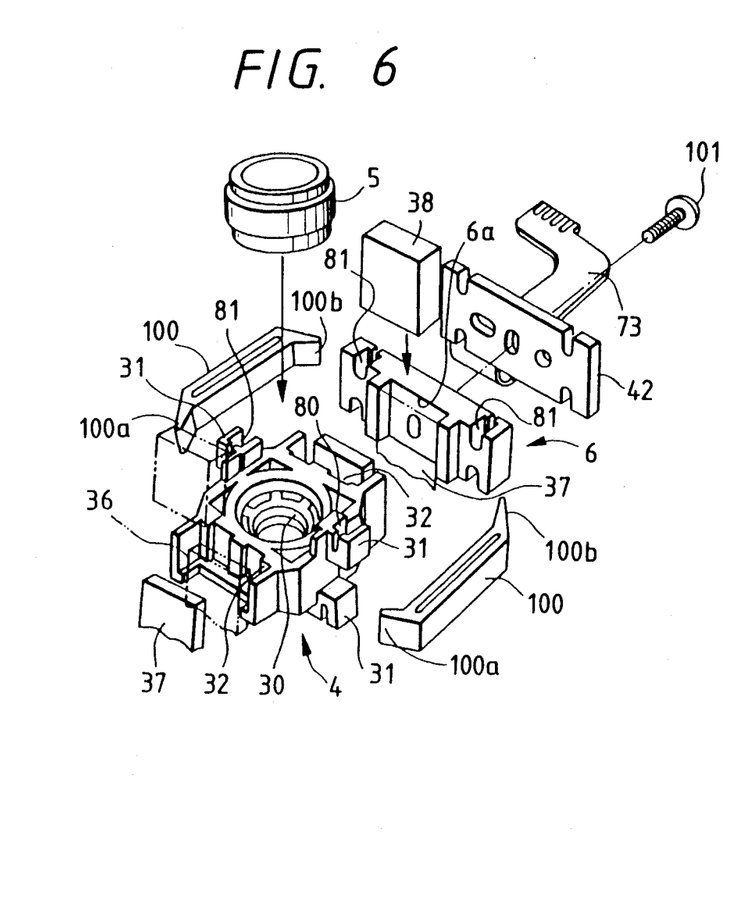
FIG. 6 is an exploded perspective view of elements constituting an actuator means for the information reading apparatus.
Figure 7:
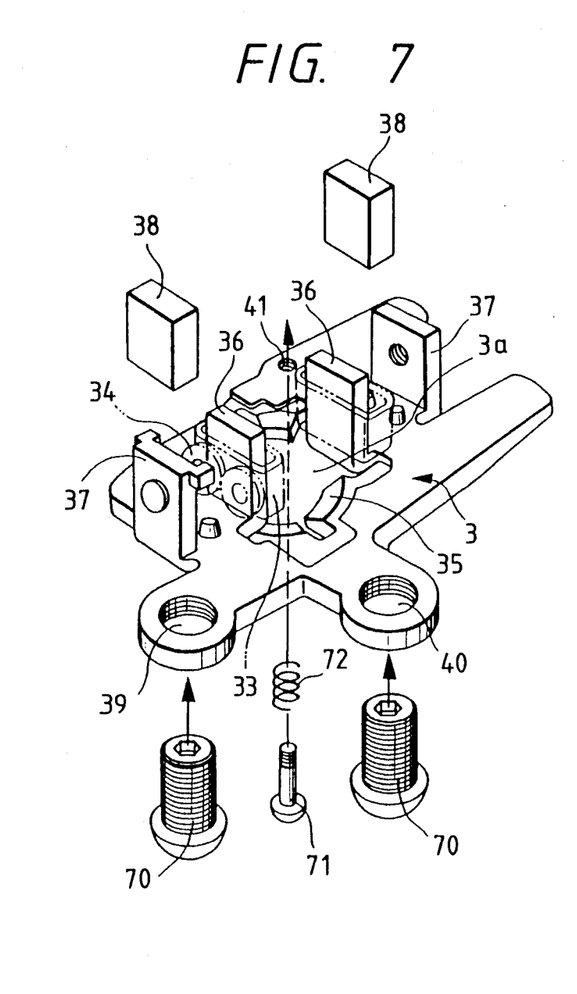
FIG. 7 is an exploded perspective view of a yoke base and elements surrounding the same.
Figure 13:
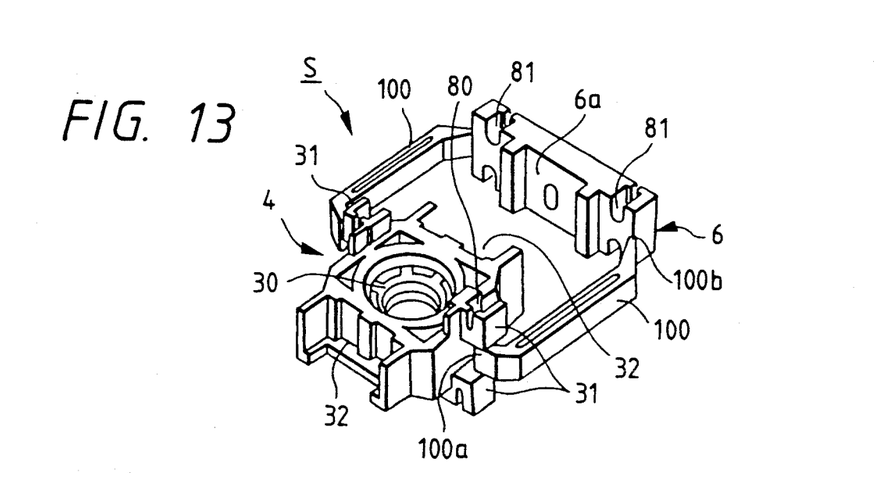
FIG. 13 is a perspective view of a lens supporting mechanism of the information reading apparatus.

An objective lens suspension body S provided with the lens holder 4 and the suspension base member 6 formed integrally therewith is first prepared as shown in FIG. 13. Namely, in detail, the lens suspension body S made of a resin is formed by an injection molding method. The lens holder 4 and the suspension base member 6 are integrally coupled with each other through a pair of bridges 100 and 100, having first ends connected to the intermediate portion of two damper tube supporting members 31 and 31 disposed on the side surface of the lens holder 4 and having the other ends connected to the end edges of both sides of the lens supporting plate. Both ends 100a and 100b of each bridge 100 is made thin (for example, a thickness of several mm) so as to be easily broken and removed (i.e., frangible). In addition, the connection of the end 100a is made weak in comparison with the connection of the end 100b so that the end 100a of the bridge 100 on the side of the holder 4 can be first broken when the bridge 100 is twisted. The focus coil 33 and the tracking coil 34 are mounted in the coil accommodating portion 32 of the lens holder 42. The damper tube 44 and the wire 45 are mounted and then soldered to the damper tube supporting member 31 of the lens holder 4 and to the U-shaped groove 81 of the supporting base plate 6, respectively. The objective lens 5 is together mounted in the holder supporting recess 30. The yoke base 3 is prepared by attaching the magnet 38 to each of the magnet supporting plates 37 as shown in FIG. 7. Namely, as shown in FIG. 6, the front recess 6a formed in the suspension base member 6 is firmly engaged with the rear side of one of the magnet supporting plates 37 by means of a screw 101.

After the respective elements or members have been assembled with the lens suspension body S, the bridge 100 is twisted to brake both the ends 100a, first, and 100b, next and then to remove the same. According to the described manner, the lens holder 4 becomes in the suspended state by the four suspension damper tubes 44 and wires 45. As described before, since the end 100a is first broken when the bridge 100 is twisted and removed from the lens suspension base member 6, there is no case that the end 100a of the bridge is never broken and removed from the lens holder 4 in a free condition, whereby the damper tube is never damaged and an adverse affect is not applied to the inclination of the objective lens 5.

As described hereinbefore, the specific jig which is utilized for the conventional technique, is not required by preparing the lens suspension body by the injection molding method and removing the bridge 100 after the predetermined elements and members have been assembled with the lens suspension body S. Moreover, the lens holder 4 and the suspension base member 6 are located with highly improved positional relationship. In addition, the lens suspension body S is formed by the injection molding method, so that the mass production of the actuator assembly will be made possible and the hardening time for the bonded portion of the wire can be eliminated because of the injection molding formation of the lens suspension body S. The maintenance of the jig can be also neglected. The effective assembling of the actuator assembly can be realized, thus being made cheap. Furthermore, the bridge 100 extends outwardly of the attachment of the suspension damper tube 44 at the time when the predetermined elements and members are assembled with the lens suspension body S, so that the damper tube is unlikely be damaged by, for example, the contact of a tool or the like to the damper tube and the wire when assembled.

What is claimed is:

1. A method of preparing an information reading apparatus comprising a body for accommodating optical elements such as a semiconductor laser, a photodiode and a prism, an objective lens disposed on a base of the body for reading information recorded in a recording medium, and an actuator means for positioning said objective lens with respect to a compact disk and actuating said objective lens in a direction along an optical axis thereof, said method comprising the steps of:
   mounting a base of said actuator means to said body;
   preparing an objective lens suspension body for suspending an objective lens holder from a suspension base member through a connection means;
   securing elements including coils and suspension wires to said objective lens suspension body;
   mounting said objective lens suspension body on said base of the actuator means; and
   removing said connection means from the objective lens holder and the suspension base member so as to suspend said objective lens holder from said suspension base member.

2. A method according to claim 1, wherein said objective lens suspension body is integrally formed by an injection molding.

3. A method according to claim 1, wherein said connection means is a pair of thin bridge members each having one end connected to said objective lens holder and the other end connected to said suspension base member.

4. A method according to claim 1, wherein the connection between each bridge member and said objective lens holder is first broken when the bridge member is twisted and the connection between each bridge member and said suspension base member is then broken.

5. An objective lens suspension body utilized for preparing an information reading apparatus which comprises:
   a lens holder for supporting an objective lens;
   a suspension base member for suspending said lens holder which is separated therefrom; and
   a frangible connection means for connecting said suspension base member to said lens holder, said connection means being easily removed from said suspension base member and said lens holder.

6. An objective lens supporting body according to claim 5, wherein said objective lens suspension body is made of resin and integrally formed through an injection molding.

7. An objective lens suspension body according to claim 5, wherein said connection means comprises a pair of bridge members disposed on both sides of said objective lens suspension body.

8. An objective lens suspension body which serves as an intermediate jig product for carrying out the method of claim 1, which comprises:
   a lens holder for supporting an objective lens;
   a suspension base member for suspending said lens holder which is separated therefrom; said
   a frangible connection means for connecting said suspension base member to said lens holder, said connection means being easily removed from said suspension base member and said lens holder.

9. An objective lens supporting body according to claim 8, wherein said objective lens suspension body is made of resin and integrally formed through an injection molding.

10. An objective lens suspension body according to claim 8, wherein said connection means comprises a pair of bridge members disposed on both sides of said objective lens suspension body.

* * * * *